US009847741B2

(12) United States Patent
Schoenlinner et al.

(10) Patent No.: US 9,847,741 B2
(45) Date of Patent: Dec. 19, 2017

(54) CIRCUIT ARRANGEMENT FOR AN ELECTROMAGNETIC HOLDING BRAKE

(71) Applicant: DR. JOHANNES HEIDENHAIN GmbH, Traunreut (DE)

(72) Inventors: Markus Schoenlinner, Tittmoning (DE); Christian von Le Suire, Chieming (DE)

(73) Assignee: DR. JOHANNES HEIDENHAIN GMBH, Traunreut (DE)

(*) Notice: Subject to any disclaimer, the term of this patent is extended or adjusted under 35 U.S.C. 154(b) by 0 days.

(21) Appl. No.: 15/233,958

(22) Filed: Aug. 11, 2016

(65) Prior Publication Data
US 2017/0063259 A1    Mar. 2, 2017

(30) Foreign Application Priority Data

Aug. 28, 2015 (DE) .................. 10 2015 216 496

(51) Int. Cl.
*H02P 3/00* (2006.01)
*H02P 29/04* (2006.01)
(Continued)

(52) U.S. Cl.
CPC ............... *H02P 3/04* (2013.01); *B60T 13/04* (2013.01); *B60T 13/743* (2013.01);
(Continued)

(58) Field of Classification Search
CPC .. B60Q 1/44; B60Q 1/52; B60T 13/66; B60T 2230/06; B60T 7/12; B60T 8/00;
(Continued)

(56) References Cited

U.S. PATENT DOCUMENTS 3,614,565 A * 10/1971 Mierendorf ............. H01F 7/064
 188/161
3,779,612 A * 12/1973 Tschannen ................ B60T 8/74
 188/181 A
(Continued)

FOREIGN PATENT DOCUMENTS

DE 102007062779 A1 7/2008
EP 1445852 A2 8/2004
(Continued)

OTHER PUBLICATIONS

Moghimi R: "Curing comparator instability with hysteresis", Analog Dialogue, Analog Devices, Norwood, MA, US, Bd. 34, Nr. 7, Nov. 2, 2000 (Nov. 2, 2000), p. 3pp, XP002386469.
(Continued)

*Primary Examiner* — Paul Ip
(74) *Attorney, Agent, or Firm* — Leydig, Voit & Mayer, Ltd.

(57) ABSTRACT

A circuit arrangement is configured to supply an electromagnetic holding brake of an electric motor with an operating voltage for releasing the holding brake, and a voltage that is reduced relative to the operating voltage for holding the holding brake in the released position. The operating voltage is supplied from a higher-level control system disposed separately from the motor and the holding brake. The circuit arrangement is disposed in or on the motor or in or on the holding brake and includes a voltage regulator adapted to regulate, independently of the operating voltage, the reduced voltage to a fixed value after the holding brake is released.

8 Claims, 2 Drawing Sheets

(51) Int. Cl.
*H02P 3/04* (2006.01)
*B60T 13/74* (2006.01)
*F16D 65/18* (2006.01)
*H02P 29/00* (2016.01)
*B60T 13/04* (2006.01)
*F16D 121/22* (2012.01)
*F16D 121/14* (2012.01)

(52) U.S. Cl.
CPC ............ *B60T 13/748* (2013.01); *F16D 65/18* (2013.01); *F16D 65/186* (2013.01); *H02P 29/00* (2013.01); *F16D 2121/14* (2013.01); *F16D 2121/22* (2013.01); *Y02T 10/7258* (2013.01)

(58) Field of Classification Search
CPC .... B60T 8/1708; B60T 8/17613; B60T 8/885; B60T 11/105; B60T 13/241; B60T 13/58; B60T 13/74; B60T 13/741; B60T 13/746
USPC .................. 318/364, 366, 372; 188/161, 158
See application file for complete search history.

(56) References Cited

U.S. PATENT DOCUMENTS

| | | | | |
|---|---|---|---|---|
| 3,811,526 | A * | 5/1974 | Adahan | B60T 8/17613 180/197 |
| 3,842,329 | A * | 10/1974 | Mierendorf | H02K 7/1023 318/372 |
| 3,917,029 | A * | 11/1975 | Maynard | B66B 1/308 187/288 |
| 4,146,276 | A * | 3/1979 | Brearley | B60T 8/17613 303/158 |
| 4,196,936 | A * | 4/1980 | Snyder | B60T 8/248 188/112 A |
| 4,203,046 | A * | 5/1980 | Homann | H02P 15/00 310/105 |
| 4,232,910 | A * | 11/1980 | Snyder | B60T 8/1708 188/181 C |
| 4,398,252 | A * | 8/1983 | Frait | B60T 13/741 188/3 R |
| 4,460,991 | A * | 7/1984 | Omoto | G11B 3/085 369/221 |
| 4,499,410 | A * | 2/1985 | Iaconponi | B60S 1/08 15/DIG. 15 |
| 4,712,841 | A * | 12/1987 | Cage | B60T 8/885 303/122.04 |
| 4,733,152 | A * | 3/1988 | Allington | F04B 49/065 210/101 |
| 4,787,205 | A * | 11/1988 | Fontaine | B60K 28/063 188/356 |
| 4,841,276 | A * | 6/1989 | Abel | B60Q 1/52 307/10.8 |
| 5,050,937 | A * | 9/1991 | Eccleston | B60T 7/20 303/20 |
| 5,091,680 | A * | 2/1992 | Palm | G11B 19/22 318/275 |
| 5,149,176 | A * | 9/1992 | Eccleston | B60T 7/20 188/1.11 E |
| 5,217,280 | A * | 6/1993 | Nykerk | B60G 17/0195 188/158 |
| 5,278,483 | A * | 1/1994 | Trumpler | H02P 3/04 318/756 |
| 5,293,517 | A * | 3/1994 | Andruet | B60T 7/12 307/9.1 |
| 5,352,028 | A * | 10/1994 | Eccleston | B60T 7/20 303/20 |
| 5,741,048 | A * | 4/1998 | Eccleston | B60T 7/20 303/20 |
| 6,291,952 | B1 * | 9/2001 | Roth-Stielow | H02P 3/04 318/366 |
| 6,294,905 | B1 * | 9/2001 | Schwartz | H03K 17/64 323/288 |
| 8,890,466 | B2 | 11/2014 | Hild et al. | |
| 2006/0103362 | A1 | 5/2006 | Eberlein | |
| 2008/0156597 | A1 | 7/2008 | Sasaki | |

FOREIGN PATENT DOCUMENTS

EP 1657815 A1 5/2006
EP 2503682 B1 9/2012

OTHER PUBLICATIONS

Ti: "LM615 Quad Comparator and Adjustable Reference (SN0S599A)", Dec. 2, 1994 (Dec. 2, 1994), pp. 1-14, XP055339339.
Stmicroelectronics: "AN1772 Application Note How to Control Power-up/Reset and Monitor the Voltage in Microprocessor Systems using ST Reset Circuits", Nov. 30, 2003 (Nov. 30, 2003), XP055275348.

* cited by examiner

CIRCUIT ARRANGEMENT FOR AN ELECTROMAGNETIC HOLDING BRAKE

CROSS-REFERENCE TO PRIOR APPLICATION

Priority is claimed to German Patent Application No. DE 10 2015 216 496.9, filed on Aug. 28, 2015, the entire disclosure of which is hereby incorporated by reference herein.

FIELD

The present invention relates to a circuit arrangement for supplying an electromagnetic holding brake of an electric motor with an operating voltage for releasing the holding brake, and a voltage that is reduced relative to the operating voltage for holding the holding brake in the released position.

BACKGROUND

Electromagnetic holding brakes serve to hold the shaft of a motor as long as the motor is out of operation and must not move, even when an external torque is applied thereto. The safe condition of such a holding brake is when the holding brake is engaged and the shaft is held fast. Therefore, electromagnetic holding brakes are designed such that they are released by an electromagnet to which an operating voltage is applied to lift the brake shoes. When this operating voltage is turned off, or when the operating voltage fails for other reasons, the braking shoes are pressed against the shaft again by means of mechanical springs.

Electromagnetic holding brakes are also used in connection with linear motors, where they lock the armature in position on the stator when in the de-energized state.

U.S. Pat. No. 3,614,565 proposes to use a higher operating voltage for releasing a holding brake than for holding the brake in the released position. In this way, on the one hand, the brake can be released more quickly and, on the other hand, the heat produced in the electromagnet during operation of the motor is significantly reduced.

EP 2503682 B1 describes a circuit arrangement in which the different voltages used for releasing the brake and holding the brake in the released position are set by pulse-width modulation. Here, the voltage at the electromagnet of the holding brake is equal to the time average of the applied voltage pulses. This publication discloses that in decentralized drive technology, it is advantageous if the drive controller and the circuit arrangement for controlling the holding brake are disposed directly in or on the motor. In this configuration, the signals for pulse-width modulated power supply to the holding brake can be generated locally by the drive controller. However, in some areas of technology, the requirement is rather for central drive control, for example, by means of a numerical control system on a multi-axis machine tool. According to EP 2503682 B1, then, in addition to the supply line for transmitting the brake voltage, a sensor line is needed to measure the voltage or current directly at the holding brake and transmit it to the central drive controller. This makes it possible, for example, to detect a voltage drop on the supply line and compensate for it by adjusting the duty factor of the pulse-width modulation. However, an additional sensor line means increased wiring complexity in a drive system and also represents an additional source of error.

SUMMARY

In an embodiment, the present invention provides a circuit arrangement for supplying an electromagnetic holding brake of an electric motor with an operating voltage for releasing the holding brake, and a voltage that is reduced relative to the operating voltage for holding the holding brake in the released position. The operating voltage is supplied from a higher-level control system disposed separately from the motor and the holding brake. The circuit arrangement is disposed in or on the motor or in or on the holding brake and includes a voltage regulator adapted to regulate, independently of the operating voltage, the reduced voltage to a fixed value after the holding brake is released.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
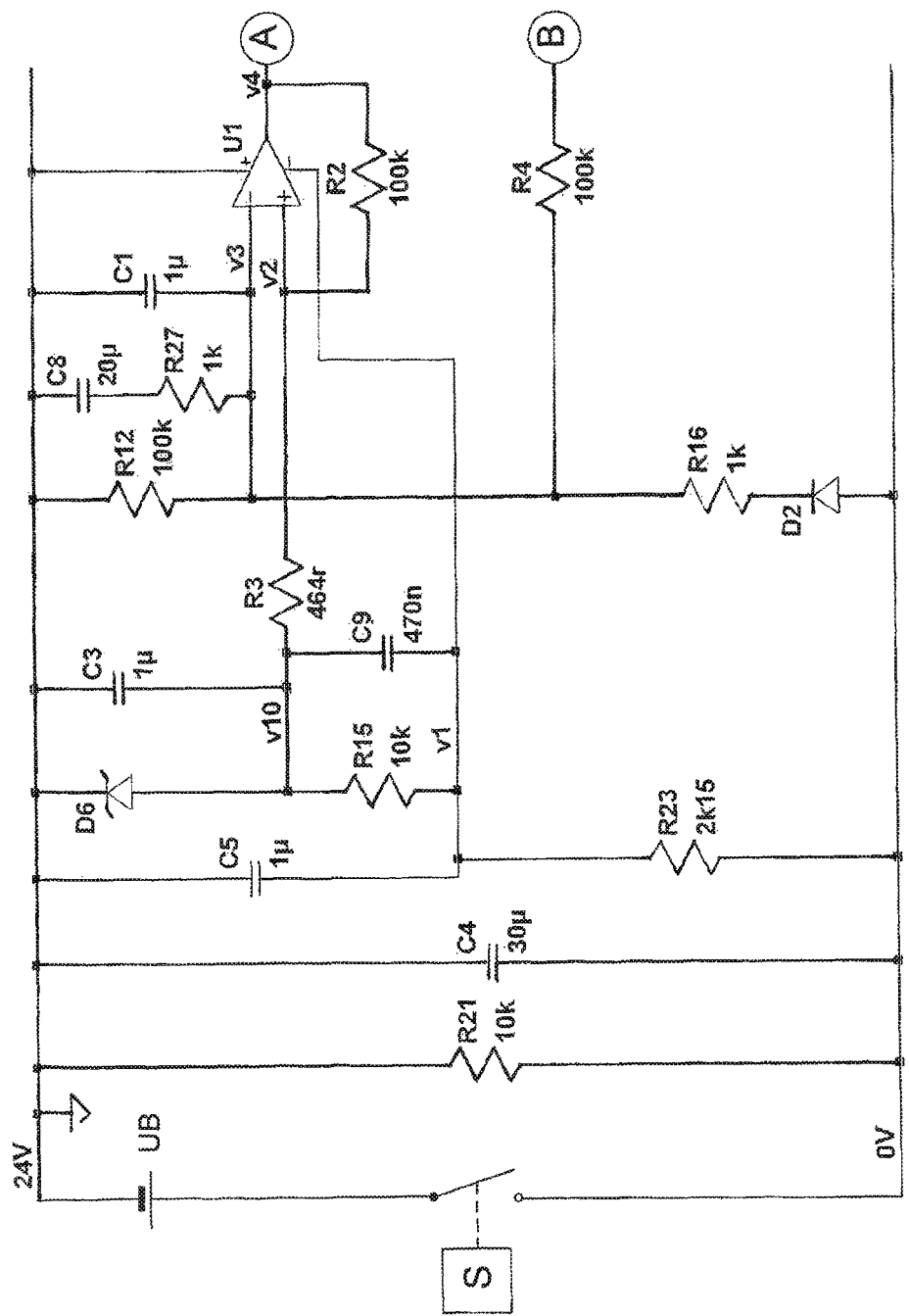
FIG. 1 shows a first portion of a circuit arrangement according to an embodiment of the invention.

In an embodiment, the present invention provides a decentrally disposed circuit arrangement for supplying an electromagnetic holding brake of an electric motor with an operating voltage for releasing the holding brake, and a voltage that is reduced relative to the operating voltage for holding the brake in the released position, which circuit arrangement only needs to be supplied with the operating voltage for releasing the holding brake from a central control system.

An embodiment of the present invention provides a circuit arrangement for supplying an electromagnetic holding brake of an electric motor with an operating voltage for releasing the holding brake, and a voltage that is reduced relative to the operating voltage for holding the holding brake in the released position. This circuit arrangement is distinguished over the prior art in that the operating voltage is supplied from a higher-level control system disposed separately from the motor and the holding brake, and in that the circuit arrangement is disposed in or on the motor or in or on the holding brake and includes a voltage regulator adapted to regulate the reduced voltage to a fixed value after the holding brake is released, and to do so independently of the operating voltage.

In this connection, the motor and the holding brake form one unit and the inventive circuit arrangement is disposed on or in this unit. The operating voltage for actuating the holding brake is supplied externally from a higher-level or central control system disposed separately and remotely. A single such central control system can control a plurality of motors and their holding brakes, for example, on a machine tool.

The circuit arrangement disposed on or in the motor or on or in the holding brake needs to be supplied with an operating voltage from a central control system only when the holding brake is to be released. When this operating voltage is turned off, the holding brake is applied again. The central control system does not have to generate a pulse-width modulated operating voltage, nor does it have to be informed in any way of the voltage drop on the operating voltage supply line to the holding brake. These disadvantages of the prior art mentioned above are overcome by this embodiment of the present invention for the central drive control.

The circuit arrangement according to an embodiment of the present invention ensures in a decentralized manner that the holding brake is released quickly (i.e., using the full operating voltage), and that the brake is subsequently held in the released position using a reduced voltage (holding voltage) that is independent of the voltage drop on the supply line to the holding brake, so as to thereby significantly reduce the power consumption. Moreover, the circuit arrangement ensures that the holding brake is quickly applied after the operating voltage is turned off.

The circuit arrangement, which is disposed decentrally in or on the motor (i.e., its housing) and thus in the immediate vicinity of the holding brake, has an integrated comparator which is used as a hysteresis converter and gives the circuit arrangement such a high degree of autonomy that only the operating voltage required for releasing the brake must be made available to the holding brake by the central control system. The circuit arrangement then autonomously ensures that initially the full operating voltage is applied to the electromagnet of the holding brake and that the brake is thereby quickly released. Subsequently, the circuit arrangement generates a voltage that is reduced by pulse-width modulation and used for holding the brake in the released position, and does so by applying the operating voltage in pulses with a suitable a duty factor so that the mean voltage across the holding brake is just the holding voltage.

Since the voltage is regulated, holding brakes of different types, especially ones having different power input requirements, can be connected to the circuit arrangement.

The time sequence of the process of releasing the holding brake; i.e., particularly the duration of the first phase, during which the holding brake is released using the full operating voltage prior to switching to the holding voltage, is determined by the rating of the individual components of the circuit arrangement and does not require any intervention by a higher-level control system. The time sequence is, as it were, already defined by the circuit arrangement.

Figure 2:
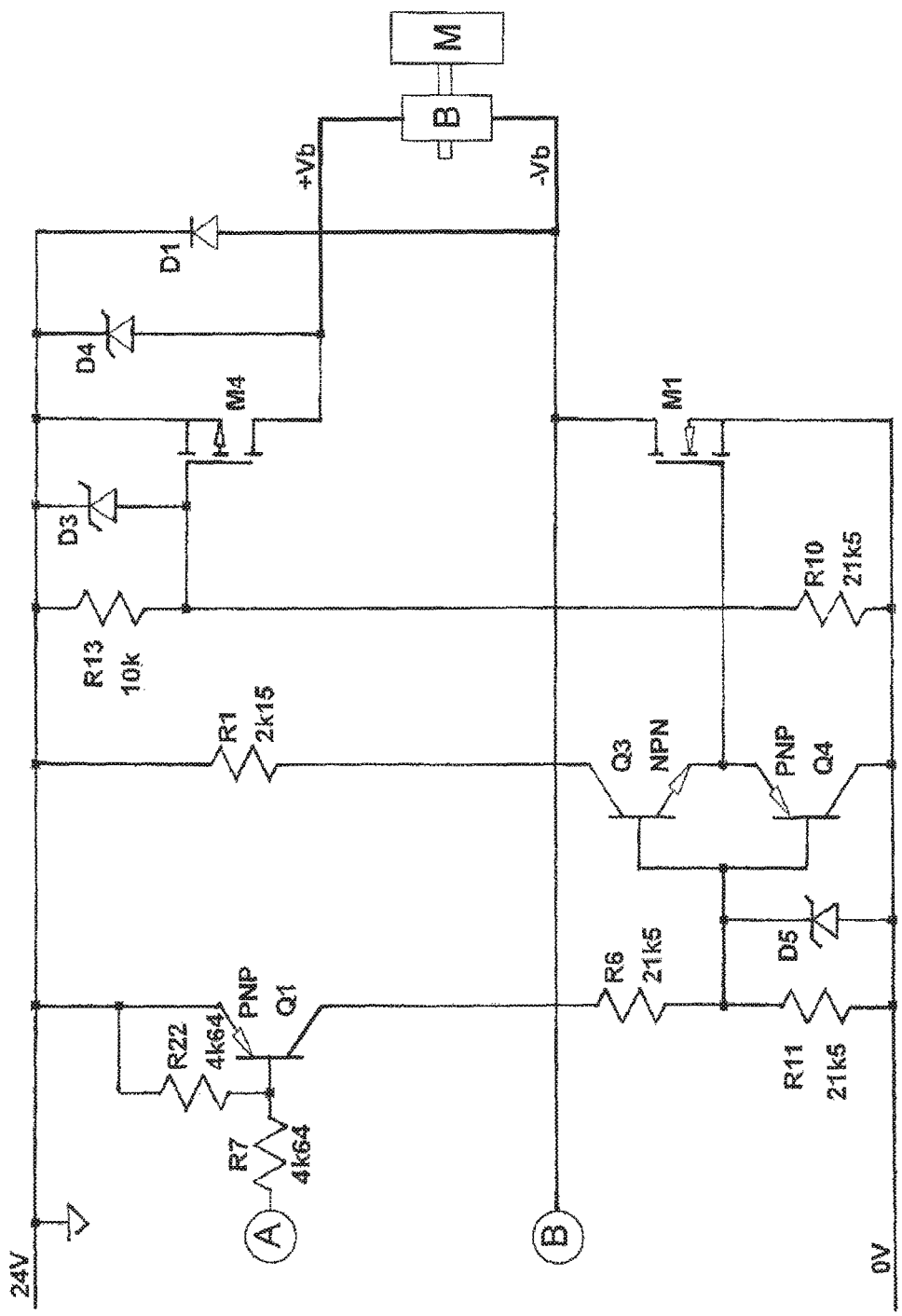
FIG. 2 shows a second portion of the circuit arrangement.

FIGS. 1 and 2, taken together, show the complete circuit diagram of an inventive circuit arrangement according to a first exemplary embodiment. This circuit diagram alone provides a comprehensive disclosure of an embodiment of the present invention to those who are skilled in drive technology, in particular in the field of electronic circuits for controlling components in drive technology.

In the following, many of these details will be explained in the text, but the right is expressly reserved to later resort to further details of the circuit arrangement disclosed in the figures.

Holding brake B of motor M is connected to terminals +Vb, −Vb of the circuit arrangement. Holding brake B releases the shaft of motor M as long as sufficient voltage is applied via these terminals.

Thus, when an operating voltage UB is externally applied to terminals 0V, 24V of the circuit arrangement, then holding brake B is connected to this operating voltage via switching elements M1 and M4. In FIG. 1 there is schematically shown a central control system S which is disposed remotely from motor M and holding brake B and is capable of turning supply voltage UB on in order to the release brake B and turning it off in order to apply brake B.

Switching element M4 is permanently on as soon as operating voltage UB is applied. In contrast, switching element M1 is clocked after the brake is released to thereby generate the desired reduced holding voltage. Since such switching elements M1 implemented as n-channel MOSFETs are more favorable than those having a p-channel (an n-channel permits faster switching at the same on-resistance), the entire circuit arrangement is referred to the higher positive potential of 24V, and not to the 0V potential, as would otherwise usually be the case.

A complementary driver composed of switching elements Q3 and Q4 is used for driving switching element M1. The complementary driver is in turn driven by switching element Q1. Switching element Q1 used as a level shifter which transmits the switching pulses v4 of comparator U1, which are referred to 24V, to switching elements Q3, Q4, which are referred to 0V. Therefore, switching element Q1 must be supplied with voltage pulses which ultimately serve to open and close switching element M1 upstream of holding brake B in such a way that the required voltage is applied to holding brake B at all times.

Thus, after operating voltage UB is turned on, it is required that the full operating voltage remain applied to holding brake B for a certain period of time until it has been reliably released. A time interval of about 1 second has proven effective for this purpose. Subsequently, the voltage across holding brake B is to be adjusted to the lower holding voltage, which may, for example, be about half the operating voltage UB. To this end, switching element M1 must be driven in pulsed mode with a duty factor of, for example, 50%. Thus, such as pulse pattern must be made available at the input of switching element Q1.

This is accomplished using comparator U1 which receives a reference voltage v2 at one input thereof. This reference voltage is derived from the upper potential +24V of operating voltage UB via a Zener diode D6 and a resistor R15. Zener diode D6 makes this reference voltage v2 independent of possible voltage drops on the line that supplies operating voltage UB. This means that even a slight decrease in operating voltage UB at the input of the circuit arrangement does not result in a reduced reference voltage v2.

A voltage v3 tapped from holding brake B is applied to the second input of comparator U1. Since the circuit arrangement is referred to upper potential 24V, this voltage v3 is tapped from negative terminal −Vb and suitably adjusted with respect to reference voltage v2 by a voltage divider composed of resistors R4 and R12. A square wave signal is tapped directly from terminal −Vb, and is converted by a smoothing capacitor C1 to a triangular voltage at the input of comparator U1.

If voltage v3, which is tapped from holding brake B and smoothed, drops below reference voltage v2, then comparator U1 emits a voltage v4 that disables switching element Q1. Switching element M1 is then disabled by complementary driver Q3, Q4; the voltage across holding brake B increases. In addition, output signal v4 of comparator U1 is coupled back to reference voltage v2 via resistor R2. In this manner, the threshold at which comparator U1 turns off in response to an increase in voltage v3 is slightly raised so that a switching hysteresis is created. The magnitude of this hysteresis, and thus the switching frequency of comparator U1, can be influenced by the selection of R2. Switching frequencies in the range of 1-10 kHz have proven effective here. By operating switching element M1 in this pulsed mode, and because reference voltage v2 is independent of losses in the line that supplies operating voltage UB, it is possible to set a holding voltage at holding brake B in a very defined manner and close to most favorable point, where the holding brake still remains reliably released, but no unnecessary power dissipation occurs in the electromagnet of brake B. Also, brake B brake re-engages faster when the operating voltage is turned off starting from the lower holding voltage.

However, since the circuit arrangement must also ensure that initially the full operating voltage UB is applied to holding brake B in order to release holding brake B, a starting capacitor C8 ensures that switching element M1 is not operated in pulsed mode for a short period of time after operating voltage UB is applied. This is because immediately after the operating voltage is applied, v3 is still lower than v2. Thus, comparator U1 becomes conductive, and holding brake B is supplied with the full operating voltage UB via switching element M1. As a result, the potential tapped from holding brake B at −Vb increases as well. Then, a current flows to starting capacitor C8 and charges it. v3 remains below reference voltage v2 until this charging process is complete after about one second; i.e., no pulsed operation takes place yet; switching element M1 remains permanently closed; holding brake B is supplied with the full operating voltage UB and is thus released in the fastest manner possible.

It is only when starting capacitor C8 is completely charged after this first second that v3 increases above v2, and the above-described pulsed operation begins. The voltage across holding brake B is now reduced to the holding voltage.

As mentioned, switching element M4 is conductive at all times once operating voltage UB is applied. Upper terminal +Vb of holding brake B is connected to upper potential 24V via this switching element M4. The pulsed operation is induced by switching element M1, which connects lower terminal −Vb of holding brake B to lower potential 0V. Each time switching element M1 is turned off, free-wheeling takes place through free-wheeling diode D1.

When the operating voltage is turned off, it is desired that holding brake B be applied as quickly as possible—within a few seconds. To this end, it is advantageous to actively turn off the free-wheeling path because of the relatively high inductance of the coil of the electromagnet in holding brake B. This is accomplished via switching element M4, which is conductive only when operating voltage UB is applied and therefore turns off when operating voltage UB is removed. The energy stored in holding brake B is then dissipated thermally in suppressor diode D4, which is connected in parallel with switching element M4. This switching element may also be referred to as "free-wheeling switching element M4."

During turning off of holding brake B by turning off operating voltage UB, a discharge diode D2 is also used. This discharge diode discharges capacitances C1 and, above all, C8 in order that when holding brake B is released again after a short period of time, the full functionality of the circuit arrangement will be available again. The time required to charge starting capacitor C8 after turning on operating voltage UB, as described above, is crucial for this. A residual charge on starting capacitor C8 could shorten this time, and thus the time during which the full operating voltage UB is still applied to holding brake B.

At the input of the circuit arrangement, a varistor R21 increases the voltage stability to interference pulses. Together with capacitor C4, it stabilizes the input voltage. Due to the clocked operation of the circuit arrangement, it would be desirable for C4 to have as high a capacitance as possible. However, electrolytic capacitors cannot be used at this location near the motor because of their insufficient thermal stability. Instead, a ceramic capacitor is used.

As a further measure for making the circuit arrangement as rugged as possible, attention was paid that comparator U1 is not affected by low-resistance connections from 24V to 0V. R23 and R16 block high currents during rapid increases in supply voltage.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A circuit arrangement for supplying an electromagnetic holding brake of an electric motor with an operating voltage from a higher-level control system disposed separately from the motor and the holding brake that releases the holding brake, and for supplying a holding voltage that is reduced relative to the operating voltage and holds the holding brake in the released position, the circuit arrangement comprising:
   a switching element connected to a terminal of the holding brake by which the operating voltage is applied to the holding brake;
   a voltage divider connected to receive and adjust a voltage tapped from the terminal of the holding brake relative to a reference voltage that is derived from an upper potential of the operating voltage;
   a comparator having a first input connected to receive the reference voltage, a second input connected to receive the voltage tapped from the terminal of the holding brake that was adjusted by the voltage divider and an output connected with the switching element, the comparator being configured to determine that the voltage at the second input has fallen below the reference voltage at the first input and to output a pulse-width modulated signal which operates the switching element in a pulsed mode so as to produce, on average, the holding voltage; and
   a starting capacitor connected with the second input of the comparator and dimensioned such that the pulse-width modulated signal is not emitted at the output of the comparator for an amount of time sufficient to initially apply the operating voltage to release the holding brake.

2. The circuit arrangement as recited in claim 1, further comprising a smoothing capacitor connected to the second input of the comparator so as to convert the voltage tapped from the holding brake to a triangular voltage.

3. The circuit arrangement as recited in claim 1, wherein the output of the comparator is coupled back to the first input via a resistor which is dimensioned such that a switching frequency of the switching element is in a range of 1-10 kHz.

4. The circuit arrangement as recited in claim 1, further comprising a Zener diode and a resistor connected with the upper potential of the operating voltage so as to produce the reference voltage at the first input of the comparator.

5. The circuit arrangement as recited in claim 1, further comprising a discharge diode configured to discharge the starting capacitor in a state in which no operating voltage is applied to the circuit arrangement.

6. The circuit arrangement as recited in claim 1, wherein the switching element is configured as an n-channel MOSFET connecting a negative terminal of the holding brake to the lower potential of the operating voltage.

7. The circuit arrangement as recited in claim 1, further comprising a free-wheeling switching element configured to block a free-wheeling current through the holding brake in a state in which no operating voltage is applied to the circuit arrangement.

8. The circuit arrangement as recited in claim 7, further comprising a suppressor diode connected in parallel with the free-wheeling switching element.

* * * * *